United States Patent [19]

Lang et al.

[11] 4,427,269
[45] Jan. 24, 1984

[54] METHOD AND APPARATUS FOR AUTOMATICALLY COMPENSATING FOR ROTATION OF IMAGES IN ARTICULATED OPTICAL SYSTEMS

[75] Inventors: Walter Lang, Königsbronn; Erich Blaha, Essingen; Roland Schmauder, Oberkochen; Franz Muchel, Königsbronn, all of Fed. Rep. of Germany

[73] Assignee: Carl-Zeiss-Stiftung, Heidenheim, Fed. Rep. of Germany

[21] Appl. No.: 324,998

[22] Filed: Nov. 25, 1981

[51] Int. Cl.³ .............................................. G02B 21/00
[52] U.S. Cl. ..................................... 350/500; 350/539
[58] Field of Search ................................. 350/500, 539

[56] References Cited

U.S. PATENT DOCUMENTS

| | | | |
|---|---|---|---|
| 2,454,959 | 11/1948 | Barns | 350/539 X |
| 2,667,813 | 2/1954 | MacGill | 350/544 |
| 3,039,204 | 6/1962 | Bryan et al. | 350/539 X |
| 4,291,937 | 9/1981 | Baudot | 350/539 |

FOREIGN PATENT DOCUMENTS

| | | | |
|---|---|---|---|
| 2308126 | 8/1974 | Fed. Rep. of Germany | 350/572 |
| 2507346 | 8/1975 | Fed. Rep. of Germany | 350/573 |
| 159473 | 7/1957 | Sweden | 350/573 |

*Primary Examiner*—William L. Sikes
*Assistant Examiner*—Matthew W. Koren
*Attorney, Agent, or Firm*—Stonebraker, Shepard & Stephens

[57] ABSTRACT

In articulated optical systems, rotation of the image takes place due to the articulations. The invention eliminates this disadvantage by producing a signal whose polarity is dependent on the direction of rotation in which the image produced in the observation plane (64) is turned with respect to the object. By the signal, a compensation element (72) arranged in the articulated optical system is turned until the signal has disappeared. Two devices are disclosed for producing the signal: 1. At the start of the articulated optical system a mark (16) is introduced by reflection, it being focused at the end of the articulated optical system on a sensor (67). 2. On all articulations there are arranged position transmitters (111,112, etc.) which are connected with a minicomputer (130) which calculates the resultant image rotation and gives off a corresponding signal via a digital analog converter (131).

7 Claims, 10 Drawing Figures

METHOD AND APPARATUS FOR AUTOMATICALLY COMPENSATING FOR ROTATION OF IMAGES IN ARTICULATED OPTICAL SYSTEMS

BACKGROUND OF THE INVENTION

The present invention relates to both a method and an apparatus for compensating for the image rotation produced by relative movement of the various parts of an articulated optical system which consists of members having lenses for optical focusing as well as articulations with mirrors or prisms for deflecting the ray path.

Articulated optical systems are used, for instance, in conjunction with operation microscopes and endoscopes in order to attach to such microscopes or endoscopes devices for simultaneous observation and/or documentation, e.g. still cameras, motion picture cameras, or television cameras. In this case it is desirable to relieve the operation microscope or endoscope from all the accessories so that it can be moved as easily as possible in all directions. The simultaneous- observation and documentation devices are therefore fixed on a special supporting arm and are connected flexibly with the operation microscope or endoscope. For this purpose, there are used articulated optical systems which consist of members with lenses for optical focusing which are connected by articulations in which mirrors or prisms deflect the ray path. Various members are able to move relative to each other telescopically or rotationally, or both. The disadvantage of known articulated optical systems resides in the fact that the displacement of the operation microscope or endoscope and the change in the articulations caused thereby causes the image to be rotated. This rotation of the image can be compensated by suitable optical elements, but the known devices, in which this must be carried out by hand, require an amount of handling which is excessive in practice.

In West German unexamined patent application (offenlegungsschrift) 27 54 614 there is described an articulated optical system in which the image rotation is automatically compensated by connecting the articulations with each other by mechanical transmissions, and in each member there is provided an additional reflection prism which is turnable by gears around its longitudinal axis. Such an articulated lens system is very demanding in mechanical and optical respects, particularly if space for manipulation in all directions is desired for the operation microscope or endoscope and numerous articulations are thus necessary.

SUMMARY OF THE INVENTION

The object of the present invention is to provide a method and an apparatus which precisely compensate automatically, with little expenditure of means, for the rotation of the image, particularly in articulated optical systems having a large space for manipulation in all directions, i.e. having a large number of articulations.

The method of the invention comprises the production of a signal whose polarity is dependent on the direction of rotation of the image produced in the plane of observation with respect to the object. Controlled by that signal, a compensation member arranged in the ray path of the articulated optical system is actuated until the signal disappears.

One apparatus for the carrying out of this method is characterized by the facts that a mask is mirrored in an intermediate image plane in which the intermediate image produced there has a defined position relative to the object, and that a sensor for the image of the mark is arranged in fixed position in the intermediate image plane in which the intermediate image produced there is to have a defined position relative to the observation device, and also that the sensor is connected via a circuit to a servo-motor for turning the optical compensation element.

The mirroring-in of a mark can be effected, for instance, by a light guide which is bevelled at the angle of 45°. As source of light for the mark, infrared radiators or light-emitting diodes, for example, can be used. The wave lengths of the optical radiation which extends from the mark and the wave lengths to which the sensor is sensitive can be optimally adapted to each other by filters. They may also be so selected that the mark is invisible to the human eye. The mark can also be produced by providing a small hemisphere of optical material which deflects all light rays of the intermediate image impinging upon it to its center, which is arranged in the first intermediate image plane. This bright centerpoint is then focused on the sensor. Another possibility consists in arranging in the first intermediate image plane a mark which is opaque to that radiation to which the sensor is sensitive. The sensor then reacts to a dark mark. In a preferred embodiment, a dove prism is used to compensate for the image rotation.

The advantages obtained by the invention include, in particular, the fact that the expense for the automatic compensating for the rotation of the image is independent of the number of articulations and this is slight even in articulated optical systems having a large number of articulations. Furthermore, no mechanical or optical tolerances enter into the precision of the compensation, since the precision depends merely on the sensitivity of response of the sensor.

The method of the invention can also be carried out by means of a device in which all articulations are connected to angular-position transmitters which are connected, via circuits for the processing of the signal, to a minicomputer which, from the signals of the angular position transmitters, produces a signal which is proportional to the total rotation of the image. The output of the minicomputer is connected to a servomotor for the rotation of the optical compensation element.

In a preferred embodiment of this solution, the optical element for compensating for the rotation of the image is also connected to an angular position transmitter whose position is fed, after signal processing, also to the minicomputer, which compares the actual value with the calculated desired value and gives off a correction signal to the servomotor via a circuit.

The advantage of this solution is that, even upon being turned on, and with rapid, wide rotations of the articulations, the optical element for the compensation is always reset on the shortest path. Since only one (relatively simple) angular position transmitter including signal processing is necessary for each articulation, the expenditure remains within reasonable limits in articulated optical systems having numerous articulations.

BRIEF DESCRIPTION OF THE DRAWINGS

The invention will be explained in further detail below with reference to the accompanying drawings, in which:

FIG. 3 (in two parts 3a and 3b joining each other end to end) is a circuit diagram for the processing of the signal for the automatic compensation for the rotation of the image;

DESCRIPTION OF THE PREFERRED EMBODIMENTS

Figures 1, 1A:
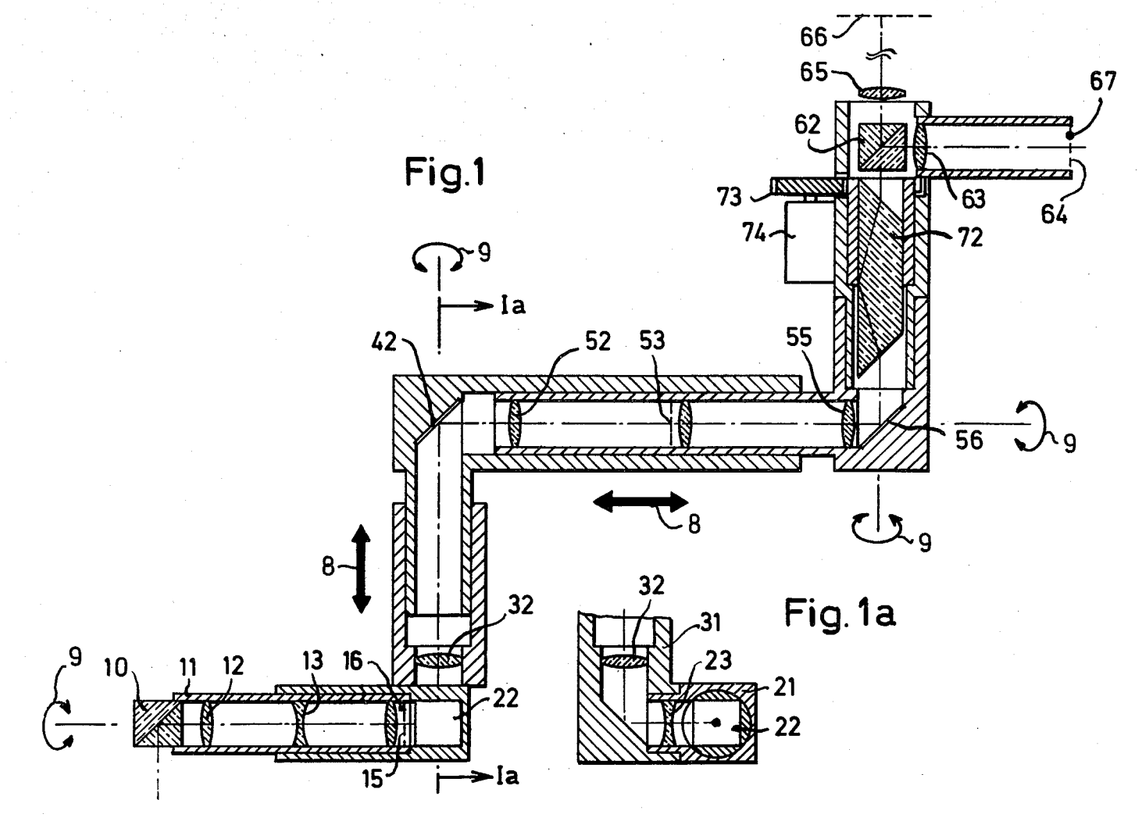
FIG. 1 is a somewhat schematic axial section through an articulated lens system with mirrored-in mark, illustrating one embodiment of the invention.
FIG. 1a is a fragmentary section taken approximately on the line Ia—Ia of FIG. 1.

FIG. 1 shows an articulated optical system which is developed as a turn-push articulated optical system, various tubular members of which may be moved axially or telescopically relative to each other, as indicated schematically by the straight arrows 8, or may be turned relative to each other, as indicated schematically by the curved arrows 9. However, the details of construction of the articulated optical system are not part of the present invention, and may be varied widely so far as the present invention is concerned, except as may be specifically noted or implied below. The mechanical construction of the articulated optical system here illustrated, apart from the means for automatically compensating for image rotation, is a separate invention.

For the present invention it is of importance that in the ray path divided out by the cube splitter 10 from the ray path of an associated optical instrument, such as an operation microscope or endoscope, a real intermediate image is formed in the plane 15 by the lenses 12 and 13. This intermediate image still has a well-defined position with respect to the associated optical instrument such as the operation microscope or endoscope, since the tube 11 is rigidly connected to the optical instrument (not shown). The intermediate image 15 contains, according to the present invention, a mark 16. This image together with the mark 16 is focused by the lenses 23, 32, and 52 via the mirrors 22 and 42 into the next intermediate image plane 53. The latter is focused, via the lens 55, and the mirror 56, an optical element for image rotation 72, the cube beam splitter 62, and the lens 65, onto the image plane 66 of a documentation device as well as via the lens 63 into an observation plane 64. The image plane 66 may represent the image plane of any desired documentation device, such as a television camera, a motion picture camera, or a still camera. The image plane 64 may represent a viewing or observation screen, as well as being used for the location of a sensor in or just outside of the image area 64, as described below. The image planes 66 and 64 have well-defined positions with respect to the documentation and simultaneous-observation device or devices.

In these planes the image, independently of the position of the articulations, should correspond, with respect also to its orientation, precisely to the initial image. In order to achieve this, notwithstanding the image rotation or twist caused when the members of the articulated system are turned relative to each other, a sensor 67 is arranged in the plane 64, and in front of the cube divider 62 there is an optical image rotating element 72 which can be turned around its optical axis via a gearing 73 by the motor 74.

Figure 2:
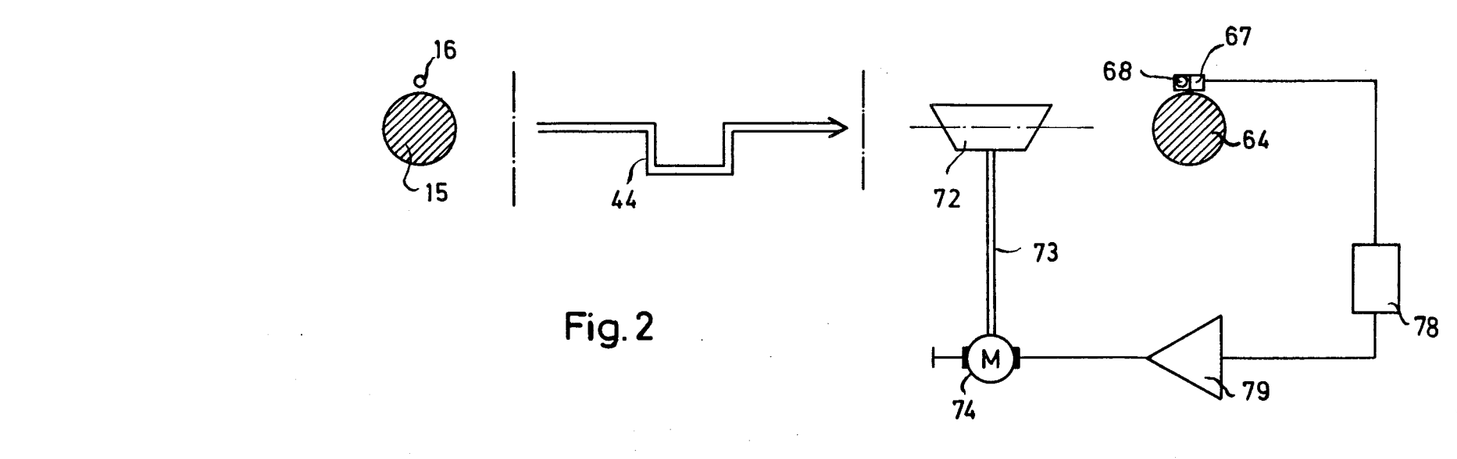
FIG. 2 is a diagrammatic showing of the automatic compensation for the rotation of the image.

The functional development of the automatic compensation for the image rotation is shown schematically in FIG. 2. In the intermediate image plane 15 the mark 16 is located within or outside of the intermediate image, preferably outside as here illustrated. Behind the articulated optical system 44 and the optical element 72 for compensation for the image rotation there is the observation plane 64 with the sensor 67, on which an image 68 of the mark 16 is focused. If this mark differs from the zero position, then the sensor 67 produces a signal. In the signal processor 78 a signal for the control of the servoamplifier 79 is produced therefrom. The servo-amplifier 79 controls the motor 74 which, via the gearing 73, turns the optical element 72 for compensation of the image rotation until the image mark 68 is again in the zero position. The image rotating element 72 is conveniently a dove prism.

Figure 3A:
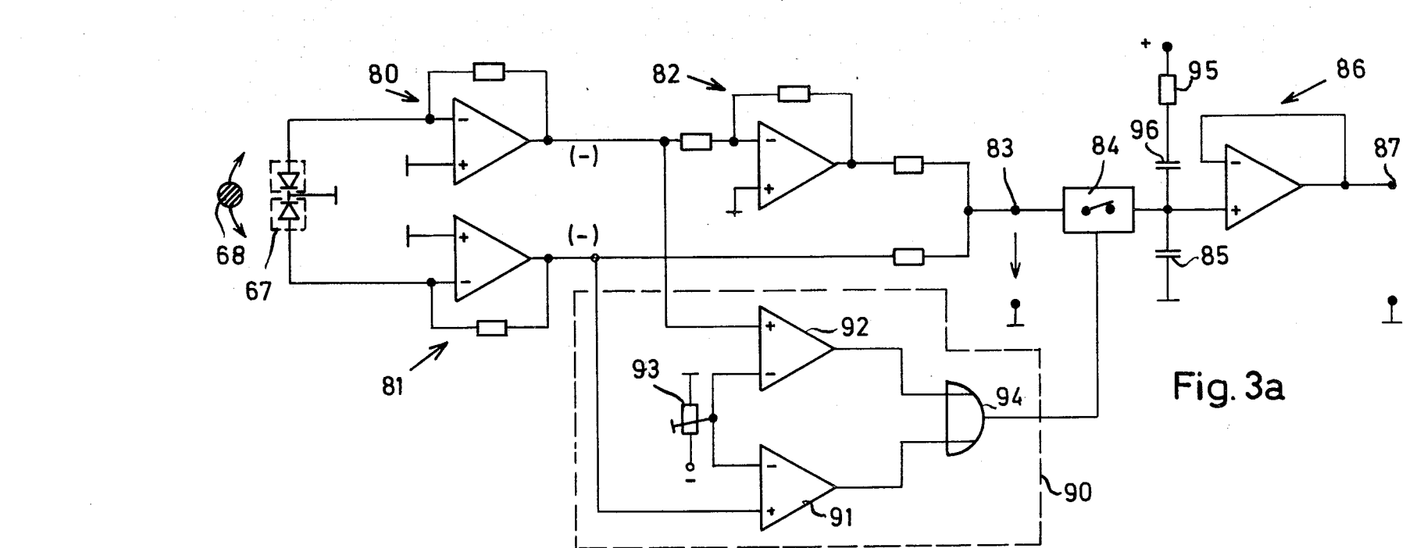
Figure 3B:
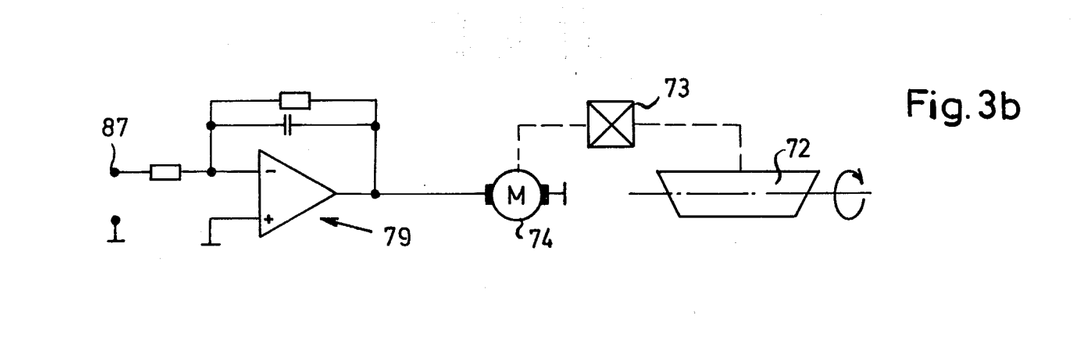

FIG. 3 shows the corresponding circuit. As this circuit diagram is a long one, it has been divided into two parts 3a and 3b which should be placed end to end to visualize the entire circuit. Thus the point 87 at the right end of FIG. 3a is the same as the point 87 at the left end of FIG. 3b. 67 is again the sensor, which is preferably developed as a differential photo-diode. The amplifiers 80 and 81 are controlled by it. The signal of the amplifier 80 is turned 180° in phase in the amplifier 82 so that a photo-signal which is dependent on direction and has a positive or negative potential with respect to ground is produced at the circuit point 83. When the image mark 68 is in the center of the differential photo-diode 67, the difference photo-signal is practically zero. Upon slow migration of the image mark 68 on the other hand, a direction-dependent voltage is produced which passes, via the closed FET switch 84 and a high-ohmic voltage follower 86, to the servo-amplifier 79, which controls the motor 74 as a function of direction and thus turns the dove prism 72 as a function of direction via the gearing 73.

Upon a rapid or sudden movement of the articulated optical system, the image mark 68 first leaves one field of the differential photo-diode and fully strikes the other field. This results in a maximum value of the difference photo-signal. In this case, the comparator 90 responds. This comparator consists of the amplifiers 91 and 92, a variable resistor 93 for the threshold value, and the OR gate 94. When the amplified photo-signal of one of the two photo-diode halves drops below the threshold value, the comparator 90 opens the FET switch 84. As long as the FET switch is open, the last difference photo-signal is stored in the capacitor 85 and the servoamplifier 79 continues to receive a control signal for the opposite direction, in which the image mark has left the differential photo-diode, until the threshold value is again exceeded, i.e. until the image mark again covers both halves of the differential photo-diode and thus the direct adjustment of the dove prism 72 takes place.

Upon the turning on of the system it is improbable that the image mark will lie on the differential photo-diode. Therefore, when turned on, the storage capacitor 85 is charged in principle, via a differentiating member consisting of the resistor 95 and the capacitor 96 by a pulse of predetermined length. The FET switch 84 is opened until the image mark 68 covers both halves of the differential photo-diode 67.

The mirroring-in of the mark takes place, in one advantageous embodiment of the invention, by a light guide which is arranged perpendicular to the optical axis and is bevelled at an angle of 45° to the optical axis. In this case, the light guide acts at the same time as cylindrical lens so that a bevelled illuminated end surface is imaged as a thin line.

Figure 4:
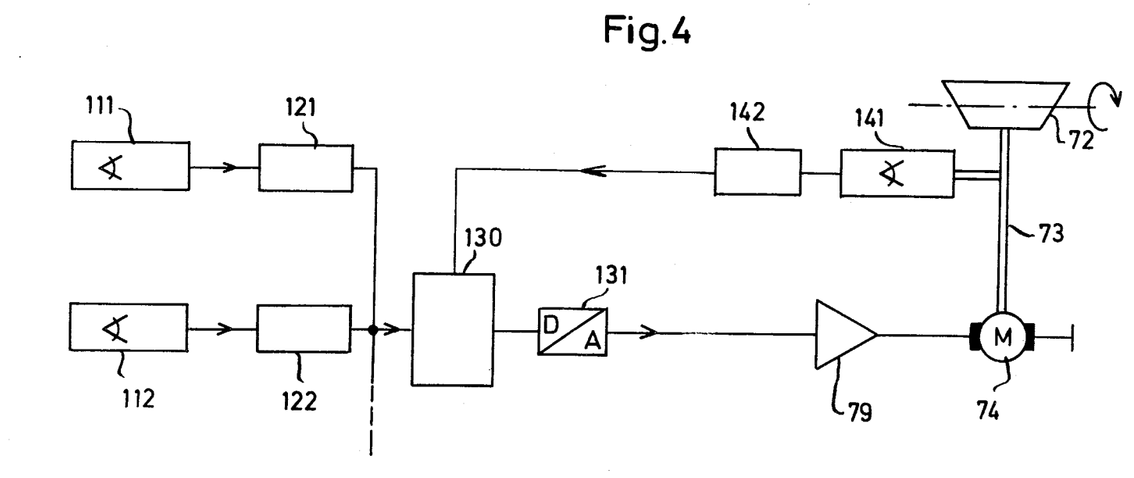
FIG. 4 is an illustrative embodiment of an articulated optical system with remote indication of the articulation positions.

FIG. 4 shows the basic circuit diagram for another solution for the automatic correction of the image rotation caused by movement of the articulations. On all articulations there are angular-position transmitters 111, 112, etc., whose position is fed to signal processing units 121, 122 etc. The signals processed there are forwarded to a minicomputer 130 which, from the individual signals, determines the resultant rotation of the image. The output values of the minicomputer which are obtained in close time sequence are fed to a digital-analog converter 131 which produces a voltage which corresponds to the position of the optical element 72 necessary in order to compensate for the image rotation. In one advantageous embodiment, this element is also connected to an angular position transmitter 141 whose position indication, after going through a similar processing unit 142, is also fed to the minicomputer. The latter continuously compares the actual value with the calculated desired value and gives off corresponding correction signals, via the servoamplifier 79, to the servomotor 74 which is connected via the gearing 73 with the optical element for compensating for the image rotation 72. After a signal zero-positioning of the reset prism, each image rotation is thus automatically corrected as a result of the rotation of the articulations.

In another embodiment, an analog signal is produced in the signal processing unit 142 and fed as an actual signal to a comparator. The comparator compares this signal with the desired analog signal and gives off a corresponding correction signal to the servomotor 74 via the servoamplifier 79.

Figures 5, 6, 6A:
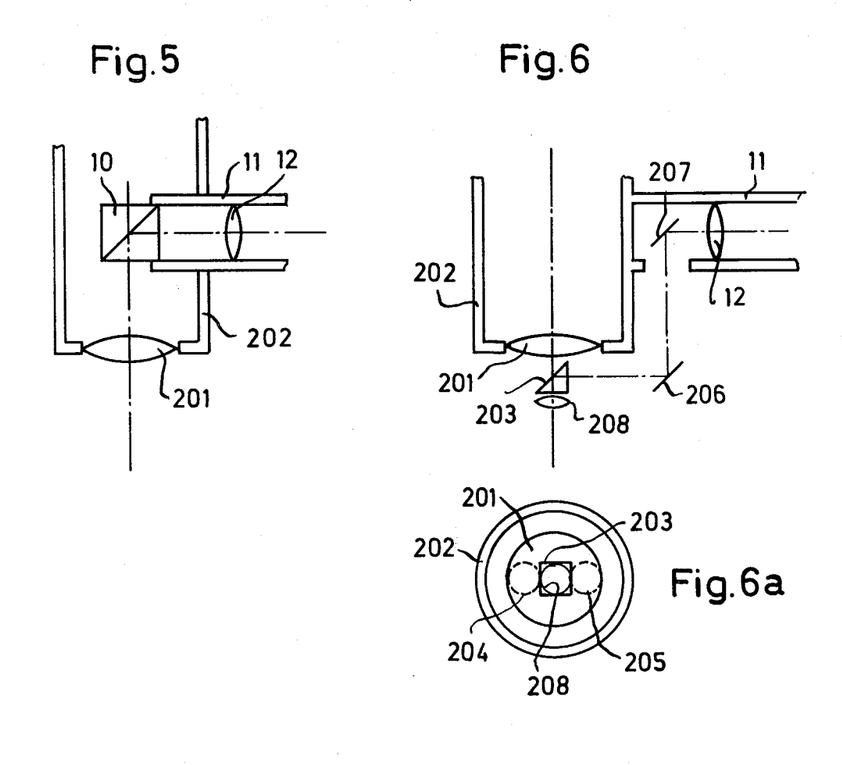
FIG. 5 is a fragmentary axial section illustrating one use of the articulated optical system with the ray path being brought out behind the objective of a microscope or endoscope by a cube splitter.
FIG. 6 is a similar view illustrating the use of the articulated optical system with the ray path being brought out in front of the objective between the entrance pupils of a stereo-opration microscope or endoscope.
FIG. 6a is a bottom plan view of part of the apparatus shown in FIG. 6.

One example of an arrangement for the coupling of the articulated optical system described to an optical instrument such as an operation microscope is shown in FIG. 5. 201 is the objective of the instrument, which is seated in the housing 202. Behind the objective there is arranged the cube splitter 10 known from FIG. 1, by which a part of the ray path is branched off into the articulated optical system which, at the start, comprises the tube 11 and the lens 12. This type of coupling is also suitable for stereo operation microscopes and endoscopes. The cube splitter 10 is seated in one ray path and a corresponding cube splitter, to which other devices can be connected, is arranged in the second ray path.

One disadvantage of this coupling is the relatively large loss of light due to the cube splitter. As a result, either the observation image becomes darker or the intensity of illumination of the object must be correspondingly increased.

This disadvantage is avoided in stereo operation microscopes or endoscopes by the arrangement shown in FIGS. 6 and 6a. In this case the ray path for the articulated optical system is branched off in front of the objective 201 by a mirror or prism 203 which is arranged between the two entrance pupils 204 and 205 of the stereo observation ray paths of the microscope, as shown most clearly in FIG. 6a, an end view. In order not to bring the end of the articulated optical system too close to the object, a deflection is effected via two mirrors 206 and 207. In front of the prism there is arranged an objective 208 which takes over the role of the objective 201 for the branched-off ray path. This objective can also be arranged further back in the ray path, for instance between the mirrors 206 and 207.

In operation microscopes, the objective designated 201 in FIGS. 5 and 6 directly images the object. In the case of endoscopes on the other hand the branching off of the ray path for the articulated optical system generally takes place at the end of the apparatus. The objective 201 then does not image the object itself, but rather an intermediate image of the object.

Figure 7:
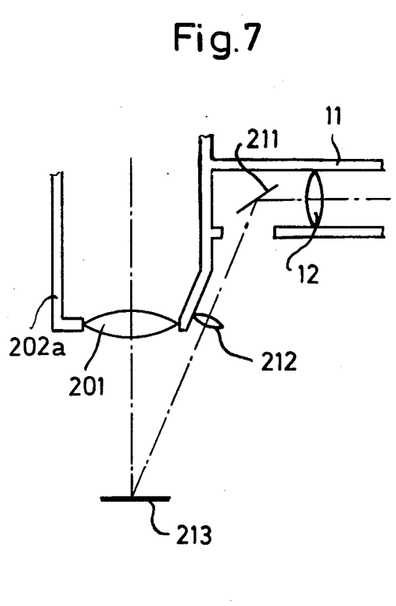
FIG. 7 is a view similar to FIGS. 5 and 6 showing the use of the articulated optical system with the ray path being brought out in front of the objective alongside of the entrance pupil.

Another possibility for coupling the articulated optical system is shown in FIG. 7. Here the ray path for the articulated optical system is taken off in front of the objective 201 and as a matter of fact, as close as possible alongside the entrance pupil of the objective 201 at a different angle directly from the object 213, and is introduced via the mirror 211 into the articulated optical system. The objective 212 assumes the role of the objective 201 for the articulated optical system.

What is claimed is:

1. Apparatus for automatically compensating for rotation of an image projected through an articulated optical system and rotated as a result of relative movement of parts of the articulated system, said apparatus comprising an optical system including a plurality of members providing an optical path and articulated to each other to move relative to each other to alter the position of an entrance end of the system relative to an exit end of the system, means for producing an image of an object at an intermediate image plane (15) in one of said members, a reference mark (16) in said intermediate image plane, said reference mark being in fixed position relative to the image at said plane, an observation plane (64), an optical image rotating element (72) located in said optical path between said intermediate image plane and said observation plane, means for projecting an image of said object and said reference mark from said reference plane along said optical path through at least one other member of the articulated system other than the one containing said intermediate image plane and through said image rotating element to said observation plane, sensor means (67) associated with said observation plane, and motor means responsive to the relation of said sensor means to the projected image of said reference mark for turning said image rotating element to an extent substantially compensating for image rotation caused by relative movement of articulated members of said system.

2. The invention defined in claim 1, wherein said sensor means is in a definite predetermined position of orientation relative to said exit end.

3. Apparatus for automatically compensating for rotation of an image projected through an articulated optical system and rotated as a result of relative movement of parts of the articulated system, said apparatus comprising an optical system including a plurality of members providing an optical path and articulated to each other to move relative to each other to alter the position of an entrance end of the system relative to an exit end of the system, means for projecting an image of an object along said optical path from one member of said articulated optical system to another member thereof, an optical image rotating element (72) located in said optical path, motor drive means for turning said image rotating element, a minicomputer (130), angular-position transmitters (111,112) responsive to movements of members of said articulated system, circuit means (121,122) for processing and delivering signals from said transmitters to said minicomputer, said minicomputer being arranged to produce a signal which is proportional to the total rotation of the image caused by movement of members of the articulated system, and means for controlling said motor drive means from such signal.

4. The invention defined in claim 3, further comprising an angular-position transmitter (141) operatively connected to said optical element (72), and circuit means (142) for delivering a signal from said transmitter (141) to said minicomputer (130), said minicomputer being arranged to compare an actual value received from said angular-position transmitter (141) with a desired calculated value received through said circuit means (121,122) and to give a correction signal to said motor drive means (74) through another circuit (79).

5. Apparatus for automatically compensating for rotation of an image projected through an articulated optical system and rotated as a result of relative movement of parts of the articulated system, said apparatus comprising an optical system including a plurality of members providing an optical path and articulated to each other to move relative to each other to alter the position of an entrance end of the system, relative to an exit end of the system, means for projecting an image of an object along said optical path from one member of said articulated optical system to another member thereof, means for producing a reference mark (16) in predetermined relation to an image of an object at an intermediate plane of said optical system and in such position that an image of said reference mark will be projected along said optical path together with the image of the object, an optical image rotating element (72) located in said optical path, motor drive means for turning said image rotating element, and sensor means (67) for sensing the projected image (68) of said reference mark, said sensor means controlling the extent to which said motor drive means turns said image rotating means.

6. The invention defined in claim 5, wherein said sensor means senses the projected image of the mark near the exit end of the optical system and after the images of the object and the mark have passed through said image rotating element (72).

7. The invention defined in claim 5, characterized by the fact that a mark which is opaque to optical radiation or an opaque pointer is arranged in a first intermediate image plane (15).

* * * * *

UNITED STATES PATENT AND TRADEMARK OFFICE
CERTIFICATE OF CORRECTION

PATENT NO. : 4,427,269

DATED : January 24, 1984

INVENTOR(S) : Walter Lang et al.

It is certified that error appears in the above-identified patent and that said Letters Patent is hereby corrected as shown below:

In the heading of the patent, add the following:

[30]    Foreign Application Priority Data

Dec. 11, 1980    [DE]   Fed. Rep. of Germany ..... 3046626

Signed and Sealed this

Seventeenth Day of June 1986

[SEAL]

Attest:

DONALD J. QUIGG

Attesting Officer

Commissioner of Patents and Trademarks